US011934635B2

(12) United States Patent
Coffey et al.

(10) Patent No.: US 11,934,635 B2
(45) Date of Patent: *Mar. 19, 2024

(54) DYNAMIC ADDRESS-BASED DASHBOARD CUSTOMIZATION

(71) Applicant: Amazon Technologies, Inc., Seattle, WA (US)

(72) Inventors: Joel Coffey, Dublin (IE); Michael Patrick Meaney, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,488

(22) Filed: Feb. 13, 2023

(65) Prior Publication Data

US 2023/0297213 A1    Sep. 21, 2023

Related U.S. Application Data

(63) Continuation of application No. 17/654,036, filed on Mar. 8, 2022, now Pat. No. 11,579,755.

(51) Int. Cl.
*G06F 3/0482* (2013.01)
*G06F 3/04817* (2022.01)
*G06F 3/0485* (2022.01)

(52) U.S. Cl.
CPC ........ *G06F 3/0482* (2013.01); *G06F 3/04817* (2013.01); *G06F 3/0485* (2013.01)

(58) Field of Classification Search
CPC ... G06F 3/0482; G06F 3/04817; G06F 3/0485
See application file for complete search history.

(56) References Cited

U.S. PATENT DOCUMENTS

| | | | | |
|---|---|---|---|---|
| 11,132,373 | B1* | 9/2021 | Timko | G06F 11/3495 |
| 11,132,749 | B1* | 9/2021 | Konson | G06F 3/04817 |
| 11,296,955 | B1* | 4/2022 | Fletcher | G06F 3/0482 |
| 11,354,434 | B2* | 6/2022 | Brannon | G06F 9/451 |
| 2013/0019195 | A1* | 1/2013 | Gates | G06F 3/048 715/771 |
| 2018/0024731 | A1* | 1/2018 | Sanches | G06F 3/04817 715/763 |
| 2019/0391716 | A1* | 12/2019 | Badr | G06F 3/167 |

* cited by examiner

*Primary Examiner* — Mong-Shune Chung
(74) *Attorney, Agent, or Firm* — Knobbe, Martens Olson & Bear, LLP

(57) ABSTRACT

Systems and methods are provided for dynamic configuration of interactive controls available on a dashboard. Interactive controls may be dynamically configured by manipulating network resource address information for a network resource that provides a dashboard, for example using query string parameters. For example, a dashboard that displays one type, source, or summary of information can be dynamically configured to allow interactive selection and display of another type, source, or summary of information depending on values passed in the network resource address information for the dashboard network resource.

20 Claims, 8 Drawing Sheets

DYNAMIC ADDRESS-BASED DASHBOARD CUSTOMIZATION

INCORPORATION BY REFERENCE TO ANY PRIORITY APPLICATIONS

This application is a continuation of U.S. patent application Ser. No. 17/654,036, filed on Mar. 8, 2022, and titled "DYNAMIC ADDRESS-BASED DASHBOARD CUSTOMIZATION". The entire disclosure of the above item is hereby made part of this specification as if set forth fully herein and incorporated by reference for all purposes, for all that it contains.

BACKGROUND

Computing devices can utilize communication networks to exchange data. Companies and organizations operate computer networks that interconnect a number of computing devices to support operations or to provide services to third parties. Data centers may include a number of interconnected computing systems to provide computing resources to users of the data center. Dashboards are a type of graphical user interface which provide users with information or metrics, such as information about or resulting from operations performed within data centers, on customer premises, or the like.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit or digits in a reference number refer to the figure number in which that element is first introduced.

DETAILED DESCRIPTION

Figure 1A:
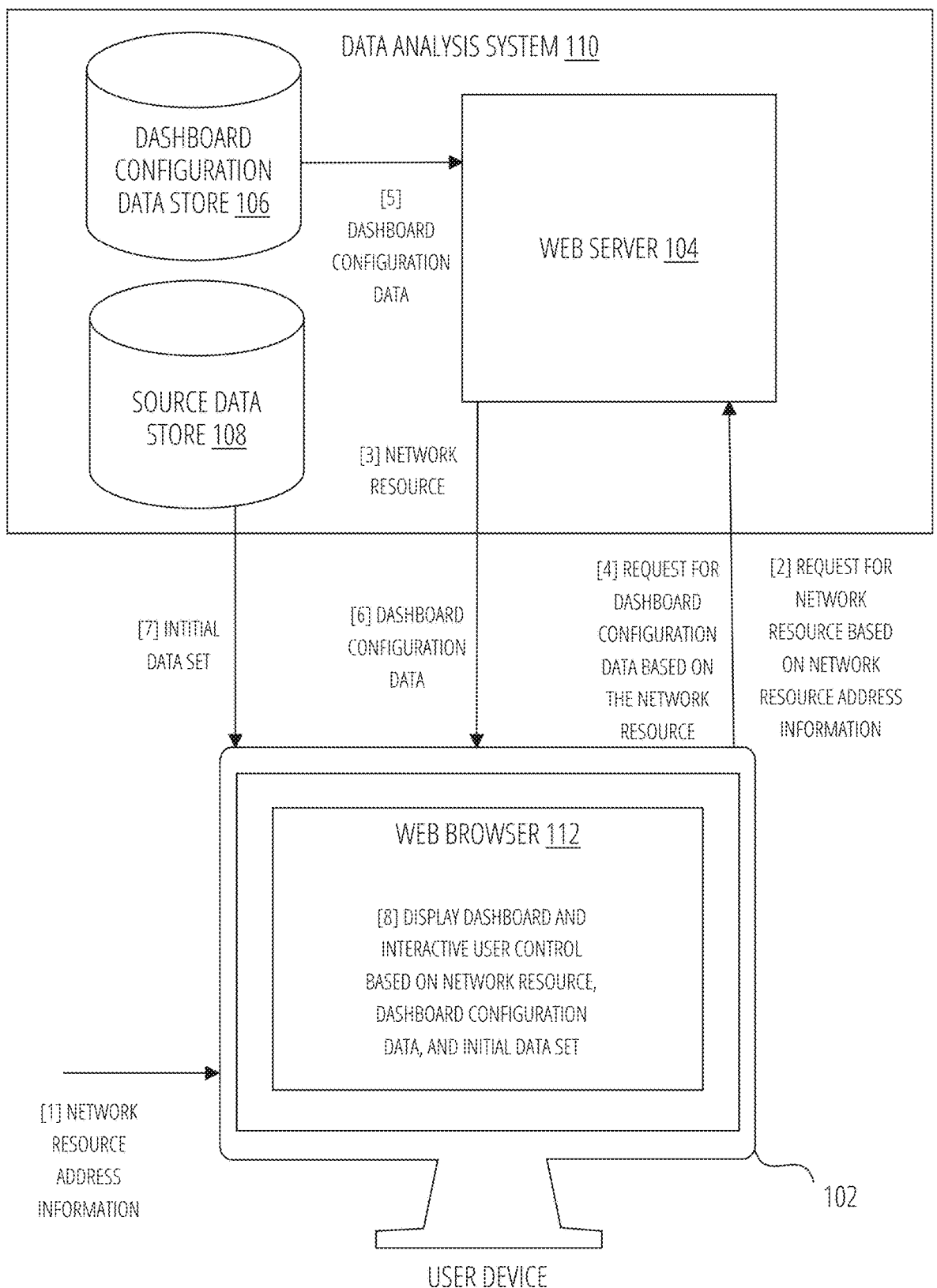
FIGS. 1A and 1B are block diagrams depicting illustrative data flows and interactions between a user device and components of a web-based dashboard system according to some embodiments.

Generally described, the present disclosure relates to dynamic configuration of interactive controls available on a dashboard. Interactive controls may be dynamically configured by manipulating network resource address information for a network resource that provides a dashboard, for example using query string parameters in a uniform resource identifier ("URI") such as a uniform resource locator ("URL"). Beneficially, such dynamic configuration of interactive controls via network resource address information enables users to quickly and efficiently create and modify interfaces, such as dashboards specific to individual groups of resources, without requiring modification of the underlying dashboards, interfaces, or the like. For example, a dashboard that displays one type, source, or summary of information can be dynamically configured to allow interactive selection and display of another type, source, or summary of information depending on values passed in the network resource address information for the dashboard network resource. The network resource address information can be generated programmatically or manually. Furthermore, network resource address information can be bookmarked or displayed on a master dashboard landing page for use in other dashboards.

As used herein, the term "dashboard" refers to any of a class of user interfaces that provide views of various information relevant to a user. Some examples of dashboards include graphical user interfaces ("GUIs") that provide summary views ("at-a-glance") of key performance indicators ("KPIs"), and may optionally provide the ability to obtain additional and/or underlying information (e.g., by allowing users to "drill down"). Dashboards are often provided as network resources such as web pages. The underlying data that is presented on a dashboard—whether in detail or summary form—may be regularly changed or supplemented, such as data regarding events occurring continuously or in bursts. Dashboards may be useful in providing real-time or substantially real-time views and insights based on such regularly changing underlying data.

Conventional dashboard customization systems allow users to configure a collection of specific widgets that display information on a dashboard. When users deal with large quantities of data across many environments, jobs, regions, or accounts and need a way to visualize data across each of these dimensions, they create a new dashboard for each different variation of each dimension. This results in many duplicated dashboards each displaying information relevant to a specific variation. Building and maintaining many similar dashboards can be time consuming and expensive.

Some dashboard customization systems attempt to remedy this issue by allowing users to configure custom controls to enable changing specific properties of the widgets in the dashboard. However, configuring such interactive dashboards may require a dashboard developer to know in advance the types of interactive controls to be included, how interactions with the controls are to affect the dashboard and data displayed therein, etc. When users manage many different dashboards, configuring these custom controls for each dashboard can be a time-consuming process. Furthermore, the configuration must be persisted and managed by the application, allowing users to update or delete the custom controls, creating additional overhead.

Some aspects of the present disclosure address the issues noted above, among others, by enabling users to define and/or configure custom interactive controls for managing dashboard data ad hoc through network resource address information for the network resource that provides the dashboard. In some embodiments, the network resource that provides the dashboard is a web page, such as set of Hypertext Markup Language ("HTML") code accessed using a URL. By setting or modifying the URL (e.g., by adding control configuration information to the query string), a user can define a custom interactive control for changing a specific property of a widget on the dashboard. Configuring the custom interactive control can include generating control configuration information defining the type of control (e.g., an HTML element such as "select," "radio," "textarea," or "checkbox"), the options that may be entered or selected using the control (e.g., the list of options available in the dropdown list of an HTML "select" control or the list of different radio buttons to display for a "radio" control), a field of data that will be set to a value selected or entered in the control (e.g., a filter field of a dataset displayed by a graph), a default value to be used if an end user does not interact with the control, some other property of the control or dashboard, or some combination thereof. For example, a user may edit the URL of a dashboard network resource, such as a web page, to configure a custom interactive control for changing an "environment" property of a graph displaying CPU utilization data in a particular multi-environment system. The custom control will be dynamically displayed on the web page based on control configuration included in the query string of the URL. An end user may interact with the control to change the "environment" property of the graph, which in turn will cause the dashboard network resource to update the graph to display data corresponding to a different environment. In some embodiments, a user can define multiple custom controls for a single dashboard, corresponding to multiple fields of data and/or data sets for the dashboard. The multiple controls may each be the same type of control, or some controls may be different types than other controls.

Additional aspects of the present disclosure relate to methods of modifying a dashboard configuration through one or more custom interactive controls defined through network resource address information. In some embodiments, a user can define a custom control to update data in a configuration file beyond replacement of a field value. For example, a dashboard may be defined by dashboard configuration information, such as configuration information in JavaScript Object Notation ("JSON") format, Extensible Markup Language ("XML") format, YAML Ain't Markup Language ("YAML") format, or the like. When a web browser accesses a dashboard network resource (e.g., an HTML file), the web browser may process the dashboard network resource, and obtain the dashboard configuration information or a reference to a separate dashboard configuration file that includes the dashboard configuration information. The dashboard configuration information (whether included in the originally-requested dashboard network resource or a separately-obtained dashboard configuration file) may specify the manner in which a dashboard is to be configured, such as the displays that are to be provided on the dashboard, one or more data sets that are to serve as the basis for display(s) on the dashboard, the field(s) and/or value(s) to be used to filter the data set(s), etc. In some cases, the configuration file may define a data set using a query. Network resource address information for the dashboard may define a custom interactive control to apply a filter or otherwise modify the data set that is to serve as the basis for a display on the dashboard. Rather than replacing a particular field value in the dashboard configuration information with a value that is provided by the interactive control (e.g., as described above with respect to the "environment" field), the dashboard network resource may use the value to find and replace certain text within the dashboard configuration information, which in turn will update one or more graphical display element defined in the updated configuration file.

Various aspects of the disclosure will be described with regard to certain examples and embodiments, which are intended to illustrate but not limit the disclosure. Although aspects of some embodiments described in the disclosure will focus, for the purpose of illustration, on particular examples of graphical display elements, user controls, data sets, network address formats, and configurations, the examples are illustrative only and are not intended to be limiting. In some embodiments, the techniques described herein may be applied to additional or alternative dashboard customization systems and methods. Any feature used in any embodiment described herein may be used in any combination with any other feature, without limitation.

Figure 1B:
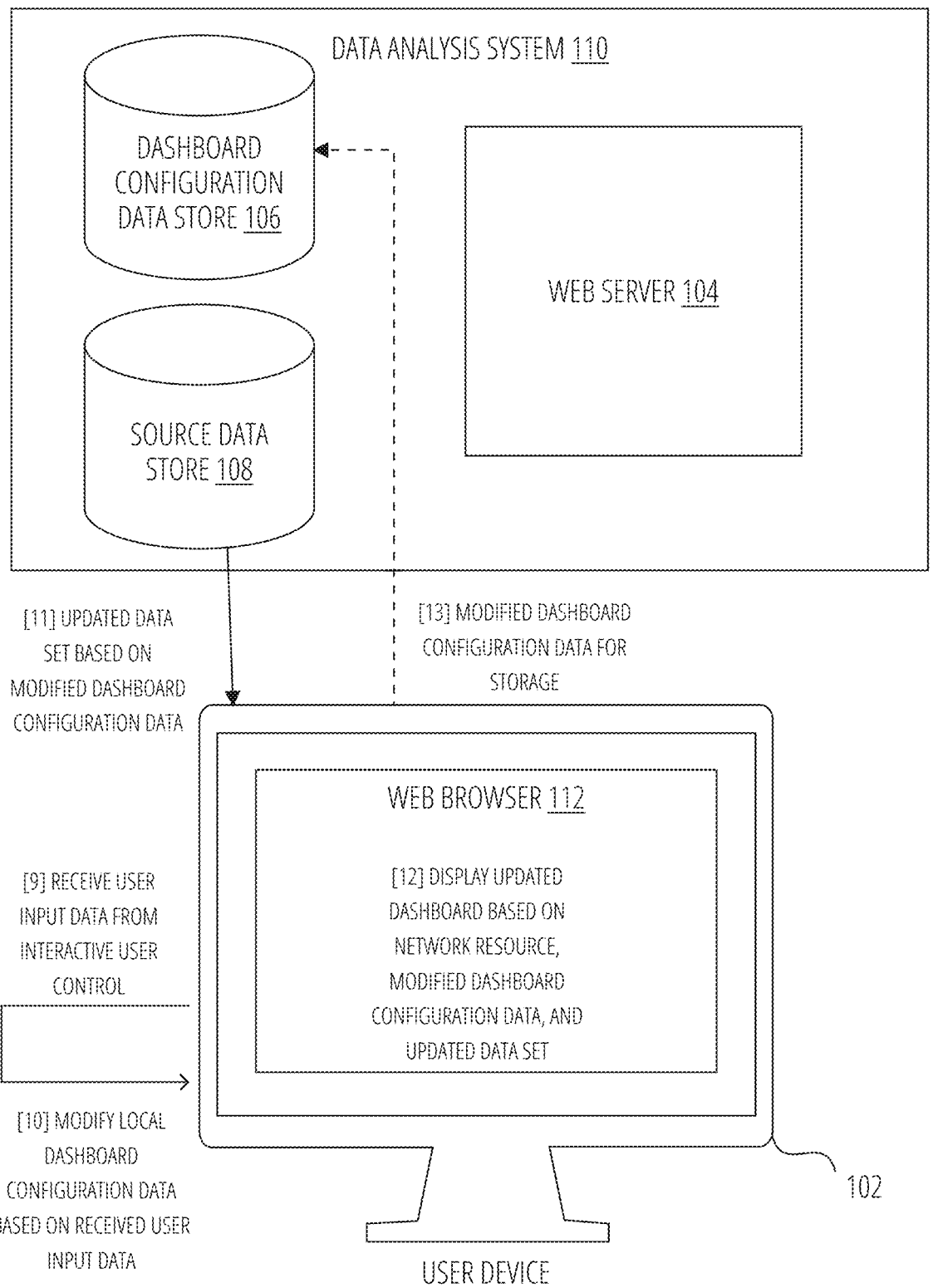

FIGS. 1A and 1B are block diagrams of an illustrative network environment depicting data flows and interactions between a user device 102 and a data analysis system 110 according to some embodiments. The data analysis system 110 may ingest, process, and facilitate the analysis of data. The user device 102 may be in communication with and interact with the data analysis system 110 to obtain, display, and interact with the data managed by the data analysis system 110. For example, the user device 102 and data analysis system 110 may communicate over one or more communication networks.

In some embodiments, a communication network (also referred to simply as a "network") may be a publicly-accessible network of linked networks, possibly operated by various distinct parties, such as the Internet. In some cases, the network may be or include a private network, personal area network, local area network, wide area network, global area network, cable network, satellite network, cellular data network, etc., or a combination thereof, some or all of which may or may not have access to and/or from the Internet.

In some embodiments, the data ingested, processed, and/or analyzed using by the data analysis system 110 may relate to the operation of network-based computing resources leased to, under the control of, or operating on behalf of various customers. For example, the computing resources may include compute systems (e.g., server computing devices configured to execute applications or virtual machines, or server computing devices offered as "bare metal" to be configured as a customer wishes), data stores (e.g., object data storage systems, block storage systems, database management systems), networking resources (e.g., physical networking hardware, virtualized networks operating as overlay networks on a physical network substrate), other computing resources, or some combination thereof. Customers may wish to evaluate the operation and/or usage of the computing resources, including but not limited to information regarding: central processing unit ("CPU") utilization; graphics processing unit ("GPU") utilization; network utilization; memory utilization; function execution duration time; application execution duration time; virtual machine ("VM") execution duration time; quantity of function invocations; data access operations; file system access operations; error messages generated, received, or otherwise encountered; logging entries or messages generated and/or received; other computing resource information; or some combination thereof. The data analysis system 110 may receive such information from a separate network computing provider that provides the subject computing resources, or the data analysis system 110 may be integrated with or otherwise part of a network computing provider. Customers may operate user devices 102 to access the information of the data analysis system 110, for example via one or more dashboards as described in greater detail below.

The data analysis system 110 may be a logical association of one or more computing devices or systems. In some embodiments, as shown, the data analysis system 110 may include one or more web servers 104 to provide network resources (e.g., web pages) to user devices. A network resource provided by a web server 104 may include—or provide access to—one or more dashboards. Such a network resource may be referred to as a dashboard network resource. Some dashboard network resources may include or reference dashboard configuration data regarding the dashboard(s) to be displayed, such as data regarding a graphical display element, a data set that is to provide data for the graphical display element, or the like. Dashboard configuration data may be stored in a dashboard configuration data store 106. Data sets that are displayed by, or are otherwise used to generated data for display by, a dashboard may be stored in one or more source data stores 108. The data analysis system 110 may include and/or have access to any number of source data stores 108.

The data analysis system 110 (or individual components thereof, such as the web server 104, the dashboard configuration data store 106, source data store 108, etc.) may be implemented on one or more physical server computing devices. In some embodiments, the data analysis system 110 (or individual components thereof) may be implemented on one or more host devices, such as blade servers, midrange computing devices, mainframe computers, desktop computers, or any other computing device configured to provide computing services and resources. For example, a single host device may execute one or more web servers 104, dashboard configuration data stores 106, source data stores 108, some combination thereof, etc. The data analysis system 110 may include any number of such hosts.

In some embodiments, the features and services provided by the data analysis system 110 may be implemented as web services consumable via one or more communication networks, such as local area networks, intranets, and/or the internet. In further embodiments, the data analysis system 110 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

A user device 102 may be or include any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. The user device 102 may communicate with the data analysis system 110 via an executable web browser application, such as web browser 112. The web browser 112 may obtain data from the data analysis system 110 or from the user device's local storage and display content based at least partly on the obtained data.

With reference to the illustrative embodiment shown in FIGS. 1A and 1B, at (1) the user device 102 may receive or otherwise access network resource address information. The network resource address information may be received from the web server 104, for example as a selectable element (e.g., a hyperlink) of a network resource (e.g., a web page) displayed by the web browser 112. In some embodiments, the network resource address information may comprise a uniform resource identifier ("URI") such as a uniform resource locator ("URL"). If the network resource address information is a URL, then the network resource address information may be a string with multiple distinct portions separated by particular characters. For example, a URL may begin with a network address section that includes a protocol (e.g., "https," "ftp"), various separation characters (e.g., "://"), a host consisting of either a registered name (including but not limited to a hostname) or an internet protocol ("IP") address in dot-separated notation, and a path (e.g., "/folder/page.html"). The URL may also include a query string (e.g., "?parameter1=value1&parameter2=value2"). Control data representing an interactive user control may be included in one or more parameters of the query string portion of a URL. Illustratively, the control data may represent a data set property name (e.g., a field of a data set on which to filter the data set), a property value (e.g., a default property of the interactive control to be used to filter the data set), and a control type (e.g., data defining the particular HTML element that is to be dynamically included in display of the dashboard network resource and through which a user may interactively provide a new property value). In some embodiments, the control data may further represent a list of values to be included as options for the interactive user control (e.g., a set of display items and a set of corresponding values, where each display item is associated with a corresponding value that will be used as the property value if the display element is selected).

At (2), the user device 102 may request a dashboard network resource from the web server 104 based on the network resource address information. In some embodiments, the dashboard network resource may be a web page, comprising HTML code, JavaScript code, or some combination thereof, which defines a dashboard display. At (3), the web server 104 may send the requested network resource to the user device 102.

At (4), the user device 102 may request from the web server 104 dashboard configuration data based on the received network resource. The dashboard configuration data may represent a graphical display element and one or more properties of an initial data set, wherein the graphical display element is to display information based at least partly on the initial data set. In some embodiments, the dashboard configuration data may represent a plurality of graphical display elements, properties from a plurality of data sets, or some combination thereof.

The dashboard configuration data may be stored in a dashboard configuration file, such as a JSON, XML, or YAML file. In some embodiments, the dashboard configuration file may be referenced in the received network resource. For example, an HTML network resource file may reference a JSON dashboard configuration file (e.g., by providing a network address of the dashboard configuration file, by providing a name and/or path of the dashboard configuration file, and/or by providing other identifying information). As a web browser 112 processes the HTML network resource file, it may recognize the reference to the JSON dashboard configuration file and request the JSON dashboard configuration file from the web server 104 (or from a different server, if a specific network address is referenced in the HTML). The request may reference the name, path, network address, and/or other identifying information of the requested dashboard configuration file.

At (5), the web server 104 may search a dashboard configuration data store 106 for the requested dashboard configuration data and obtain the requested dashboard configuration data from the dashboard configuration data store 106. For example, the web server 104 may search for a dashboard configuration file based on a requested file name or other identifying information. At (6), the web server 104 or other source of the dashboard configuration file sends the requested dashboard configuration data to the user device 102.

At (7), the user device 102 may obtain the initial data set (defined in the dashboard configuration data) from a source data store 108. For example, the dashboard configuration data may define a graph displaying CPU utilization data. In this example, the initial data set would consist of the CPU utilization data to be displayed in the graph. Further examples of initial data sets will be described in greater detail below.

At (8), the user device 102 may display a dashboard and interactive user control based on the obtained network resource, dashboard configuration data, and the initial data set. The dashboard may comprise a graphical display element defined in the dashboard configuration data and/or dashboard network resource. The graphical display element may display information based at least partly on the initial data set (e.g., in a chart, graph, table, etc.). The interactive user control may be based on data contained within the network resource address information, as processed by executable code within or associated with one or both of the dashboard network resource and/or dashboard configuration data. Further examples of dashboards, interactive user controls, and graphical display elements will be described in further detail below.

At (9), the user device 102 may receive user input data. The user input data may represent a value associated with an interaction with the interactive user control. For example, the user input data may represent a string value entered into a text field, a value associated with a display item selected from a dropdown list or set of radio buttons, or the like. At (10), the user device 102 may modify the local dashboard configuration data based om the received user input data. For example, the web browser 112 may update a representation of dashboard configuration data in memory, update a variable for use in executable functions, or the like. Further examples of the receipt and use of user input associated with a dynamically displayed interactive control will be described in greater detail below.

At (11), the user device 102 may obtain an updated data set based on the modified dashboard configuration data. At (12), the user device 102 may display the updated dashboard based on the obtained network resource, the modified dashboard configuration data, and the updated data set. For example, the user device 102 may display an updated graphical display element showing information based on the updated data set. Examples of obtaining updated data sets and displaying dashboard display elements based thereon will be described below.

Optionally, at (13), the user device 102 may send the modified dashboard configuration data to a dashboard configuration data store 106 for storage.

Figure 2:
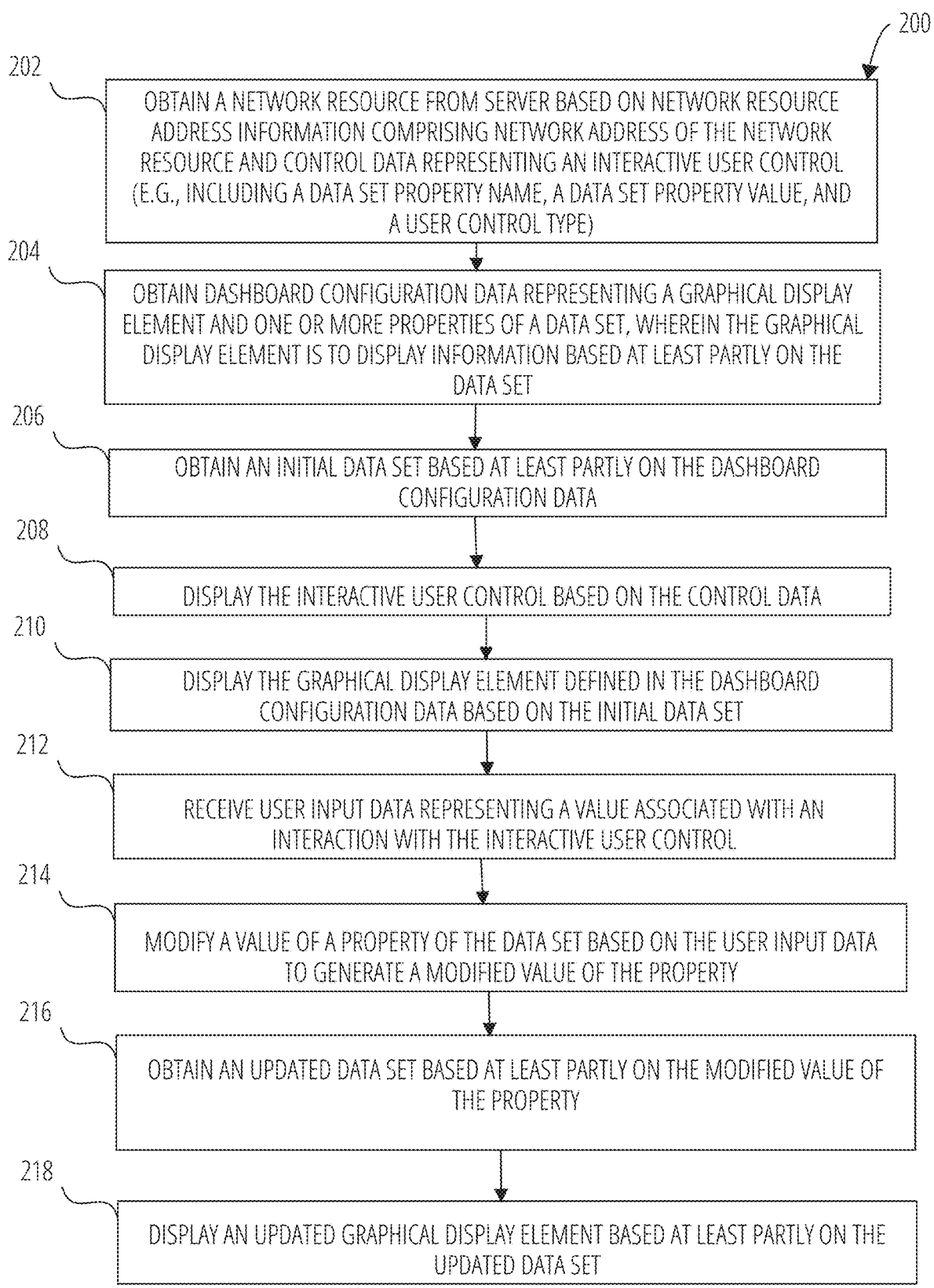
FIG. 2 is a flow diagram of an example routine for dashboard customization according to some embodiments.

FIG. 2 is a flow diagram of an example routine 200 for dashboard customization according to some embodiments. The routine 200 enables dynamic display of an interactive user control through manipulation of network resource address information. The interactive user control may further enable modifying dashboard configuration data, which will in turn update the graphical display elements displayed on the dashboard.

The routine 200 begins at block 202. In some embodiments, the routine 200 may begin in response to an event, such as when the user device 102 displays a network resource with network resource address information (e.g., a web page with a link), requests a network resource using network resource address information (e.g., after user activation of a link), or the like. When the routine is initiated, one or more processors of a user device 102 may perform operations based on instructions of an executable browser application in memory (e.g., random access memory or "RAM") of the user device 102. In some embodiments, the routine or portions thereof may be implemented on multiple processors, serially or in parallel.

In some embodiments, the user device 102 may receive a plurality of network resource address information items which the user device 102 may use to obtain different dashboard network resources or different instances of a single dashboard network resource. For example, the network resource address information items may reference the same dashboard network resource but may contain control configuration data representing different interactive user controls, interactive user controls associated with different data set properties, interactive user controls associated with different lists of display items and/or corresponding values, etc.

In some embodiments, a web server may dynamically generate and send to the user device 102 a list of URLs. The URLs may all contain the same network resource address but may contain different query strings representing different interactive user controls. For example, in a multi-environment implementation of computing resources, there may be different environments (e.g., development, test, production) each with a separate set of physical or virtual computing resources. The same dashboard network resource, and the same or substantially the same dashboard configuration data, may be re-used to display information about computing resources in each environment. In order to maintain separation in the manner in which data about the environments is accessed, a separate network resource address information item (e.g., a separate URL) for each environment may be generated to provide an interactive user control for selection of only the computing resources in a particular environment. Moreover, the network resource address information may be dynamically generated when a user accesses a dashboard home screen, thus allowing for an up-to-date listing of the computing resources in the interactive control for each of the separate environments. This may be particularly advantageous in systems that provide or allow for usage of a set of computing resources that varies from time to time. Illustratively, one URL may be generated for the production environment, and may include user control configuration data defining an interactive user control (e.g., an HTML "select" element or set of radio buttons) with options corresponding the computing resources currently in the production environment; a second URL may be generated for the development environment, and may include user control configuration data defining an interactive user control with options corresponding the computing resources currently in the development environment; and so on.

At block 202, a user device 102 or some other system or component may obtain a web page from a server based on network resource address information. The network resource address information may comprise the network address of the web page or other network resource, and control configuration data (e.g., in a query string) for an interactive user control to be dynamically included in the display of the network resource. In some embodiments, the network resource address information is a URI, such as a URL.

The control configuration data may comprise values of various properties, characteristics, settings, and the like for the interactive control. For example, the control configuration data may compromise string values corresponding to a property name (e.g., a data set property or other property identified in the dashboard configuration data for a particular data set and/or dashboard display element), a property value, and a user control type. In some embodiments, the user control type is an HTML element, such as "select," "radio," "textarea," or "checkbox."

In some embodiments, the control configuration data may comprise additional values, such as options that may be entered or selected using the control. For example, the user control configuration data may include a list of display items available in the dropdown list of an HTML "select" control, the checkboxes to display for a "checkbox" control, or the different radio buttons to display for a "radio" control. A corresponding list of values may also be provided, where each display item is associated with a corresponding value that is used in updating the data set, dashboard display element, or otherwise modifying display of the dashboard. As another example, the data may comprise a default value to be used if an end user does not interact with the control, a display label for the user control, size and/or placement information for display of the user control, other data, or some combination thereof.

In some embodiments, the control configuration data may include data source information representing a data source to be accessed for additional data to configure the interactive user control. For example, the data source information may represent a function or query to be executed to obtain a list of display items (and, in some cases, corresponding values) selectable via an HTML "select" control, "radio" control, "checkbox" control, or the like. The user device 102 may execute or request execution of the function via a server, such as the web server 104 or some other server. In this way, the values that may be selected via the user control may be dynamically determined after the user device 102 has accessed previously-generated network resource address information. With reference to one illustrative example, a dashboard may be used to access data about individual users of an application. A dynamic interactive user control may be used to select from list of user IDs that have used the application within a window of time, such as within the last hour. Information about which user IDs have accessed the application within the past hour may be stored at a server in an application log. Instead of supplying a list of user IDs in the control configuration data of the network resource address information, data source information about a data source (e.g., query, function, host ID, data set ID, or the like) may be included in the control configuration data. Parameters to be used in conjunction with the data source information, such as a time window (e.g., 60 minutes) may also be included in the control configuration data. Thus, a URL or other network resource address information for the dashboard may be generated and provided to the user device 102 in advance, while the options selectable via the interactive user control may be dynamically determined at the time the user device 102 prepares the user control for display.

At block 204, the user device 102 may obtain dashboard configuration data from a server, based at least partly on the dashboard network resource obtained at block 202. In some embodiments, the dashboard configuration data may be stored in a dashboard configuration file, such as a JSON file. The dashboard configuration file may be referenced in the web page. In other embodiments, the dashboard configuration data may be stored in the web page itself.

The dashboard configuration data may represent a dashboard display element, such as a graphical display element, and one or more properties of a data set. The graphical display element may display information based at least partly on the data set. For example, the dashboard configuration data may represent a graph element that is to display CPU utilization information, wherein the CPU utilization information includes data from a CPU utilization data set. The dashboard configuration data may further represent a modifiable "environment" property of the CPU utilization data set.

In some embodiments, the dashboard configuration data may comprise data representing a plurality of dashboard display elements, one or more properties from a plurality of initial data sets, or some combination thereof.

At block 206, the user device 102 may obtain an initial data set based at least partly on the dashboard configuration data. For example, in the above example regarding CPU utilization information, the dashboard configuration data may represent a value of "Dev" for the modifiable "environment" property. That is, the graphical display element defined in the dashboard configuration data may be configured to display CPU utilization information in a specific environment of a multi-environment deployment of computing resources, such as a development environment. Accordingly, the user device 102 may obtain an initial data set containing CPU utilization data from the development environment.

At block 208, the user device 102 may display the interactive user control represented by data in the query string. In some embodiments, the obtained network resource is an HTML file defining the elements to be displayed in a web browser. The HTML file may include or reference executable code, such as JavaScript code, that displays the interactive user control defined in the query string. For example, the executable code may be configured to modify the document object model ("DOM") of the network resource to dynamically insert the interactive user control into display of the network resource based on control configuration data in the network resources address information. In other embodiments, the HTML file may directly incorporate the data representing an interactive user control, and the interactive user control may be configured based on user control data defined in the query string. For example, the HTML may define a "select" element that gets added to the DOM of the network resource during the course of HTML processing, and the HTML may further include executable code, such as JavaScript code, that may modify the DOM to dynamically adjust one or more properties of the existing instance of interactive user control based on control configuration data in the network resources address information.

At block 210, the user device 102 may display the graphical display element represented in the dashboard configuration data.

Figure 3:
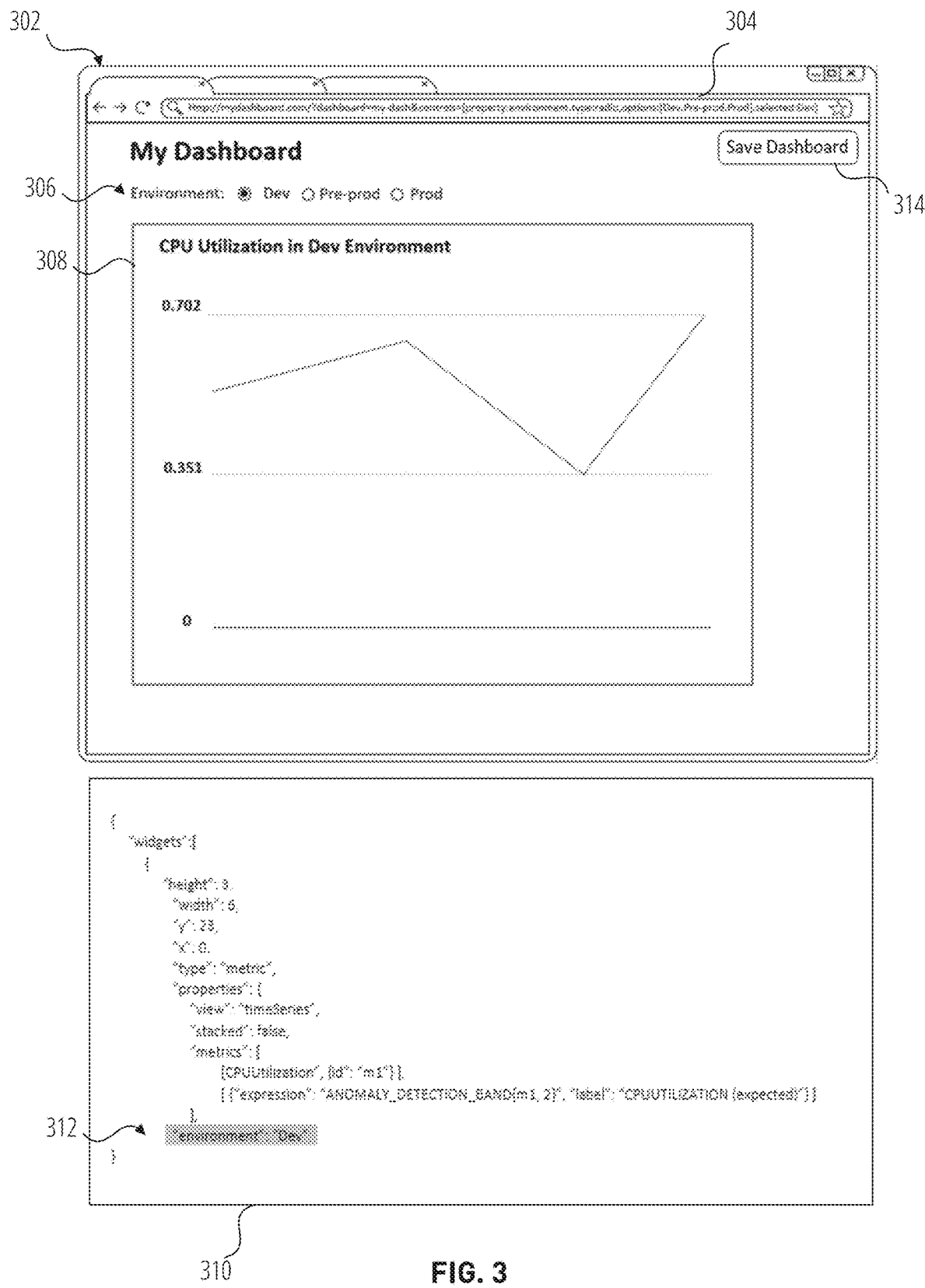
FIG. 3 shows an illustrative user interface and illustrative dashboard configuration data according to some embodiments

FIG. 3 shows an illustrative user interface 302 and illustrative dashboard configuration data 310. The user interface 302 illustrates an example dashboard displayed by the user device 102 as the dashboard may appear after block 210 in FIG. 2. Furthermore, the dashboard configuration data 310 represents example dashboard configuration data obtained by the user device 102 in block 204 of FIG. 2.

In some embodiments, the user interface 302 may be presented by the web browser application 112, and the presentation may be of the web page obtained by the user device 102 at block 202. As shown, the user interface 302 may include network resource address information 304, an interactive user control 306, a graphical display element 308, and a user control 314.

Furthermore, as shown, the network resource address information 304 may be a URL. The URL may further include a query string. The query string may include control data representing an interactive user control. For example, as shown, the control data may represent an interactive user control of type "radio," a property name of "environment," a list of options representing values of the "environment" property ("Dev", "Pre-prod", and "Prod"), and a selected property value of "Dev." As shown, the user interface 302 may include an interactive user control 306 based on the control data in the network resource address information 304.

Furthermore, as shown, the dashboard configuration data 310 may represent a graphical display element 308 and a data set property 312. For example, as shown, the graphical display element may be a "metric" and the property of the data set may be an "environment," with the property set to a value "Dev." As shown, the user interface 302 may include a graphical display element 308 based on the dashboard configuration data 310.

Returning to FIG. 2, at block 212. The user device 102 receives user input data representing a value associated with an interaction with the interactive user control. For example, the user input data may represent a value associated with an interaction with the interactive user control 306 in user interface 302 in FIG. 3. As a further example, the user input data may represent the value "Prod" based on a user selecting the "Prod" radio button in interactive user control 306.

At block 214, the user device 102 modifies a value of a data set property associated with the interactive user control, as specified by the dashboard configuration data 310. The value may be modified based on the user input data to generate a modified value of the property. For example, in the above example regarding FIG. 3, the user device 102 may modify the "environment" property 312 in the dashboard configuration data 310 to generate a modified value "Prod," based on the user input data. In FIG. 3, such a modification may result in the string value "Dev" in property 312 to be updated to the string value "Prod." Such a modification may signify that the graphical display element defined in the dashboard configuration data is to display CPU utilization information in a different environment—the production environment—rather than CPU utilization information in the initial environment, the development environment.

At block 216, the user device 102 may obtain from a database an updated data set based at least partly on the modified value of the data set property. For example, in the above example regarding FIG. 3, the user device 102 may obtain an updated data set representing CPU utilization information for the "Prod" environment. At block 218, the user device 102 displays an updated graphical display element based at least partly on the updated data set.

Figure 4:
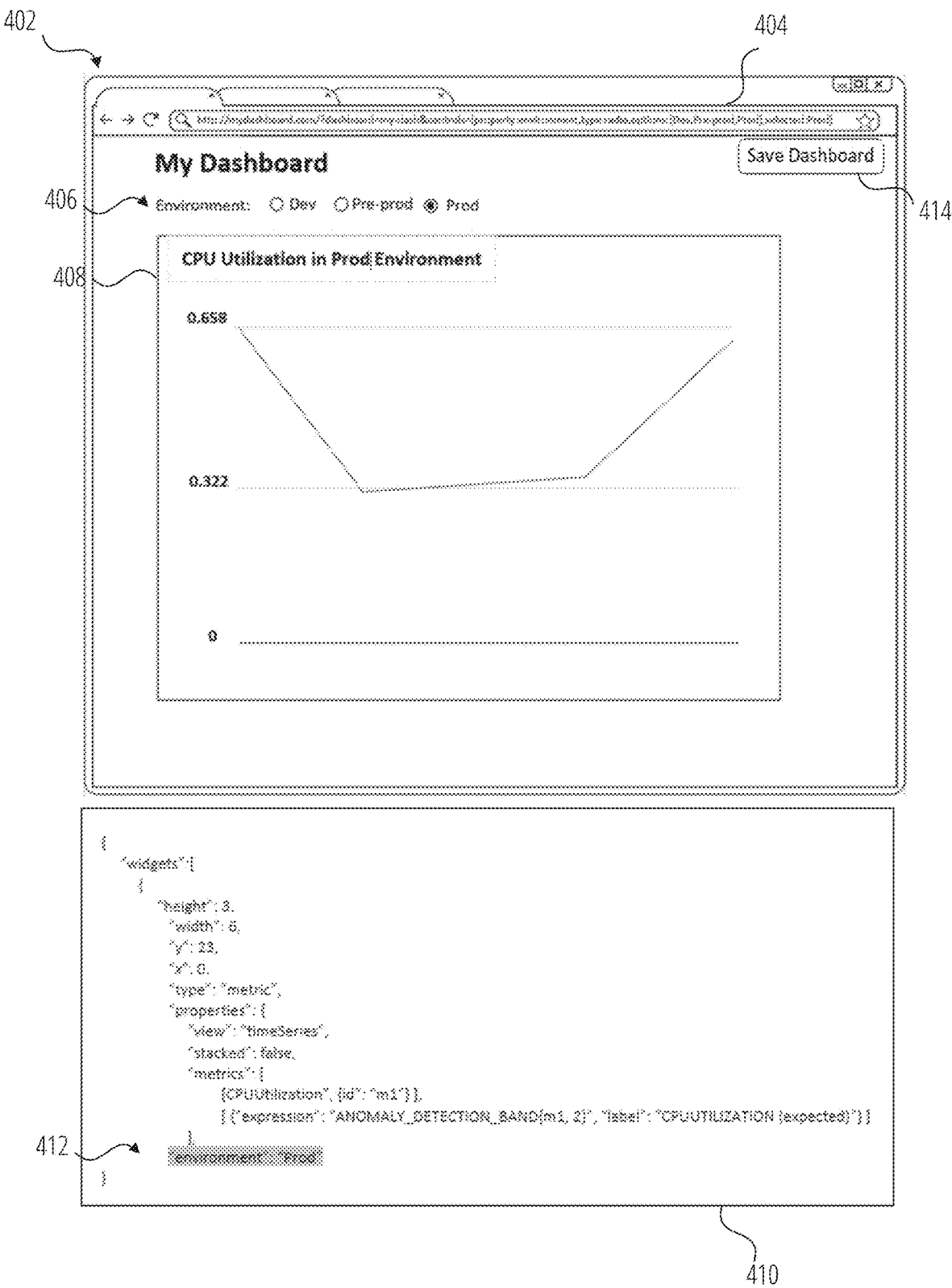
FIG. 4 depicts a user interface and configuration file according to some embodiments and illustrates updates to the user interface and configuration file based on user input to a user control.

FIG. 4 shows an illustrative user interface 402 and illustrative dashboard configuration data 410. The user interface 402 illustrates an example dashboard displayed by the user device 102 as the dashboard would appear after block 218 of routine 200, continuing the example shown in FIG. 3 and described above. As shown in FIG. 4, the user device 102 may receive user input data representing the value "Prod" associated with an interaction with the interactive user control 406.

Furthermore, the dashboard configuration data 410 represents example modified dashboard configuration data as modified by the user device 102 in block 214 of routine 200. As shown, the user device 102 may modify the value of the "environment" property 412 in dashboard configuration data 410 to generate a modified value of "Prod" based on the value associated with the interaction with the interactive user control 406 specified in the network resource address information 404. Furthermore, as shown, the user device 102 may obtain an updated data set based at least partly on the modified value of the property, the updated data set representing CPU utilization information for the "Prod" environment. Finally, as shown, the user device 102 may display an updated graphical display element 408 based at least partly on the updated data set.

While FIG. 4 shows an example of the dashboard configuration data 410 being updated in substantially the same form that it was originally received (e.g., in a JSON format), the example is illustrative only and is not intended to be limiting or required. In some embodiments, the web browser 112 may load dashboard configuration data into an in-memory data structure with the same or a different structure. In some embodiments, the web browser 112 may load dashboard configuration data, or individual elements thereof, into in-memory variables for use in subsequent process. For example, the "environment" property 312 from FIG. 3 may be loaded into a property variable, and the value of that variable may be changed based on the user interaction with the interactive user control.

Figure 5:
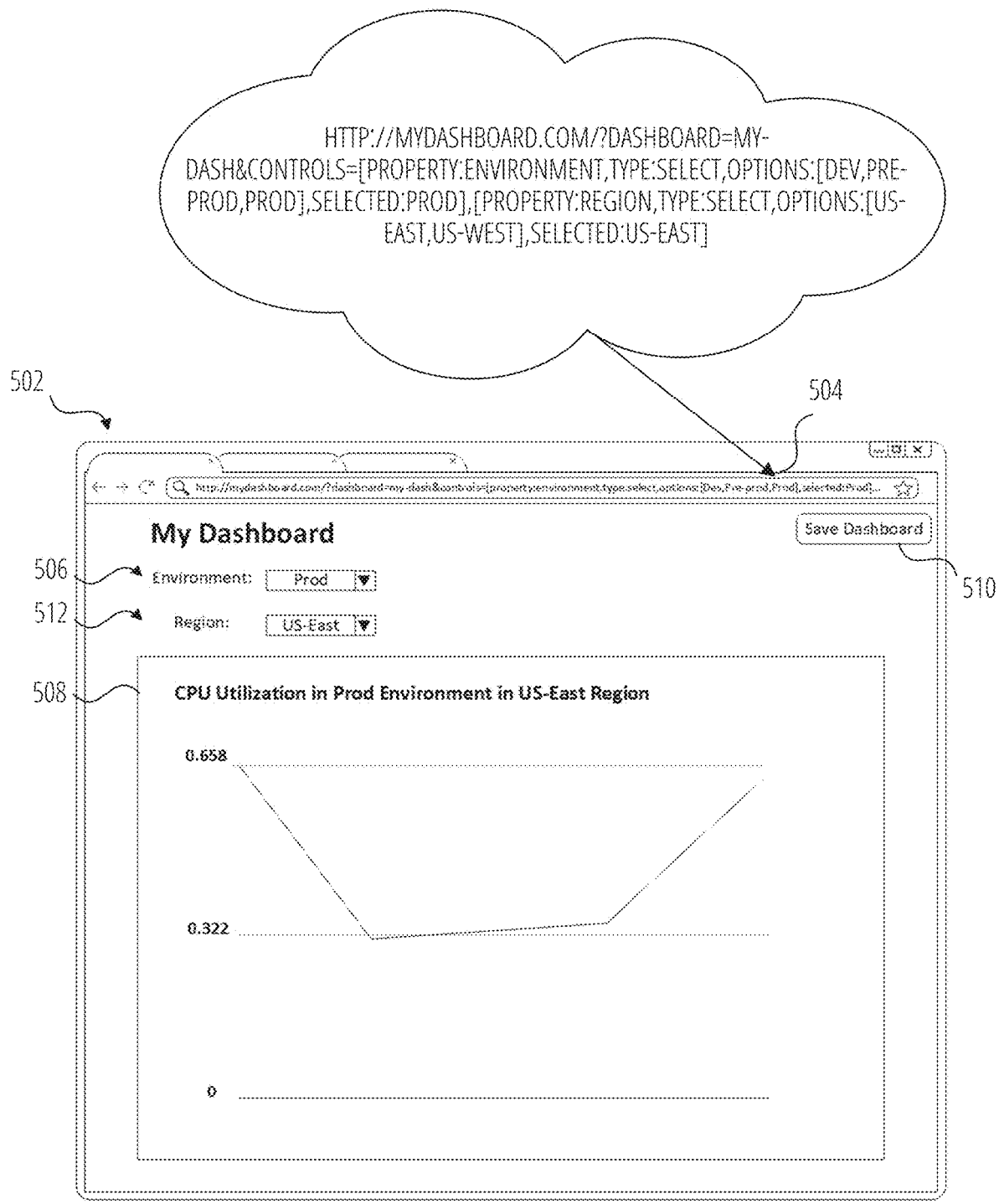
FIG. 5 shows an illustrative user device according to some embodiments.

FIG. 5 shows another illustrative user interface 502. As shown, the user interface 502 may include network resource address information 504, multiple interactive user controls 506 and 512, a graphical display element 508, and a user control 510.

As shown, the network resource address information 504 may include control data representing more than one interactive user control. The control data for each interactive user control may comprise data representing a data set property name, property value, and user control type. The control data for each interactive user control may comprise data representing the same or different data set property name, property value, and user control type.

For example, as shown, network resource address information 504 includes control data representing two interactive user controls 506 and 512. The control data representing both interactive user controls comprises data representing a user control type of "select." However, the control data representing interactive user control 506 comprises data representing a data set property name of "environment," while the control data representing interactive user control 512 comprises data representing a data set property name of "region."

In response to receiving user input data representing a value associated with an interaction with either interactive user control 506 or 512, a user device 102 may modify the dashboard configuration data to generate a modified value of a property represented by the dashboard configuration data. For example, in response to receiving user input data representing a value "us-east" associated with an interaction with interactive user control 512, the user device 102 may modify the dashboard configuration data to generate a modified value of "us-east" for the "region" property represented by the dashboard configuration data. The user device 102 may then obtain an updated data set representing CPU utilization in the "US-East" region and display an updated graphical display element 508 reflecting the updated data set.

In response to receiving user input data representing an interaction with user control 510 (also shown in FIG. 4 as user control 414, and in FIG. 3 as use control 314), the user device 102 may send dashboard configuration data to a database for storage. If the user device 102 has modified the data dashboard configuration data since obtaining the dashboard configuration data, the user device 102 will send the modified dashboard configuration data to a database for storage.

Figure 6:
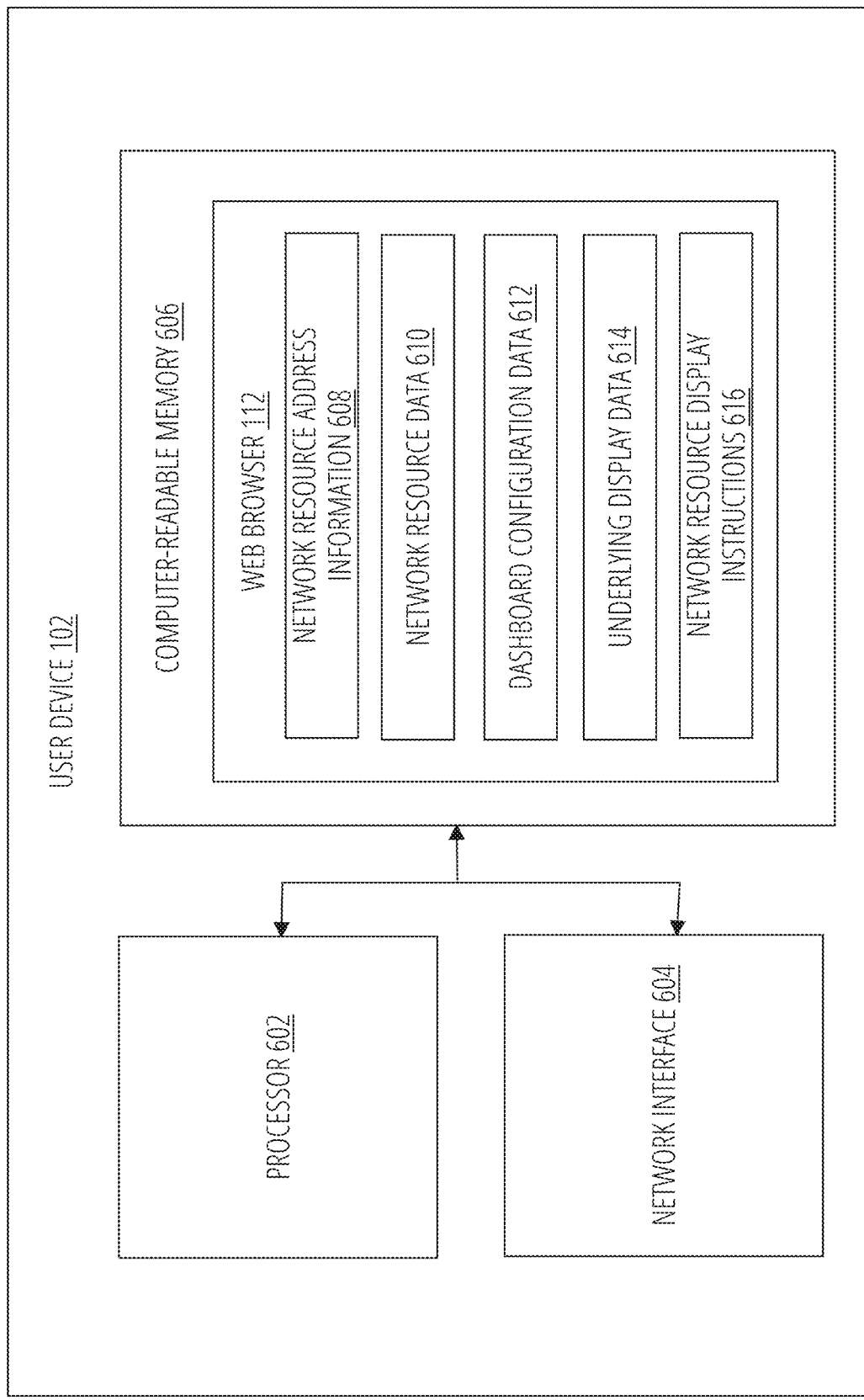
FIG. 6 is a block diagram depicting an illustrative user device system according to some embodiments.

FIG. 6 is a block diagram depicting an illustrative user device 102 according to some embodiments. As shown, the user device 102 may comprise: one or more computer processors 602, such as CPUS; a network interface 604, such as a network interface card ("NIC"); and a computer readable memory 606, such as random access memory ("RAM") or other volatile or non-storage. The computer readable memory 606 may store an executable web browser application 112. The web browser application 112 may store, at various times, network resource address information 608, network resource data 610, dashboard configuration data 612, underlying display data 614, and network resource display instructions 616.

The processor 602 may be in communication with the network interface 604 and the computer readable memory 606. The processor 602 may be programmed by the executable web browser application 112 to process network resource address information 608 and extract user control data regarding an interactive user control to be dynamically included in a dashboard display. The processor 602 may be further programmed by the executable web browser application 112 to obtain network resource data 610, dashboard configuration data 612, and underlying display data 614. The processor 602 may be further programmed by the executable web browser application 112 to execute network resource display instructions 616.

Figure 7:
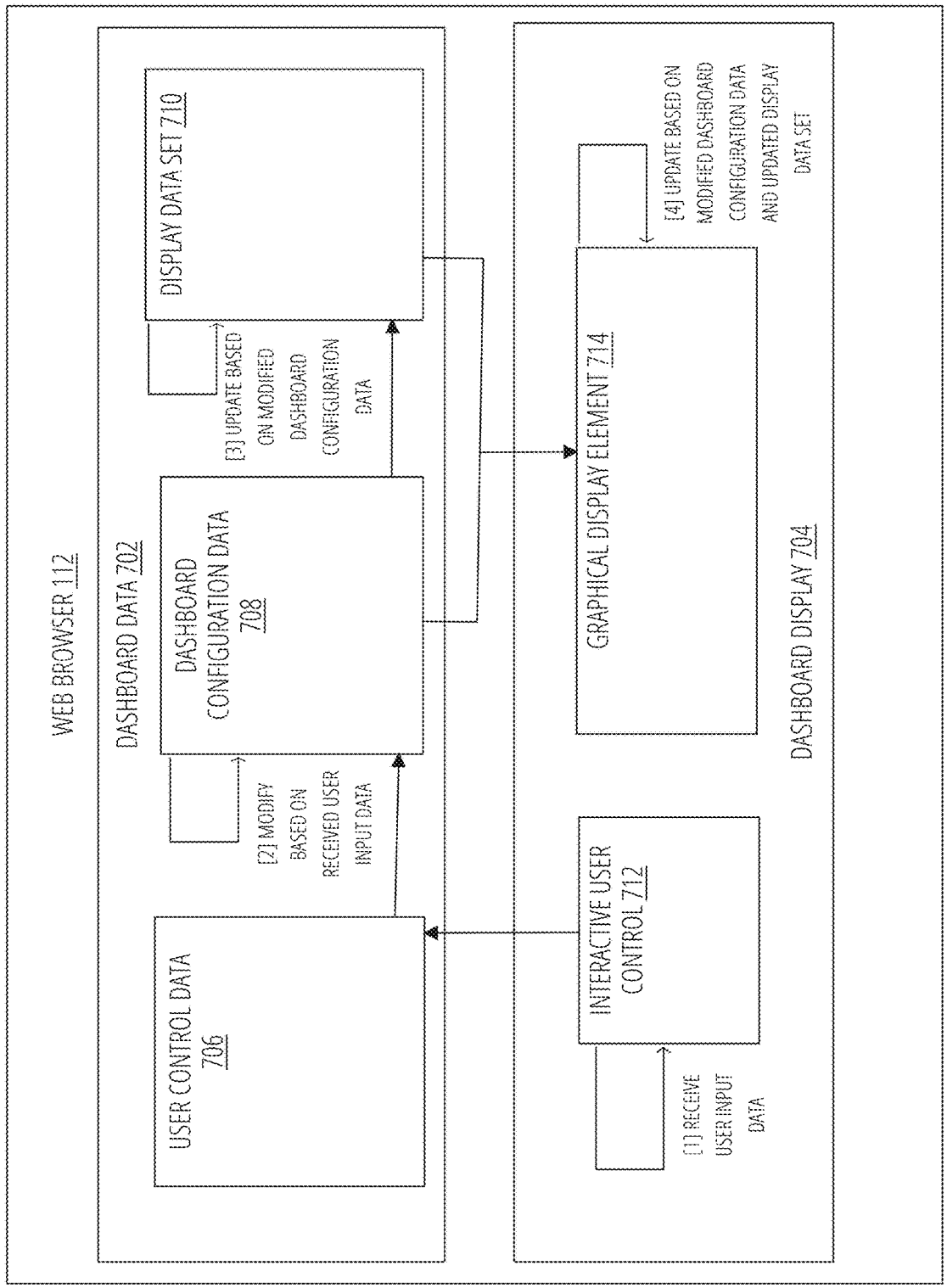
FIG. 7 is a block diagram depicting the relationships between data and graphical display in an illustrative web browser according to some embodiments.

FIG. 7 is a block diagram depicting the relationships between data maintained by a web browser 112 (e.g., in computer-readable memory 606) for processing, and display data generated by the web browser 112 for presentation by a user device (e.g., via a screen). As shown, dashboard data 702 may be maintained and used to generate a dashboard display 704. The dashboard data 702 may comprise user control data 706 (e.g., control configuration data extracted from the network resource address information for the currently-displayed network resource), dashboard configuration data 708 (e.g., from a dashboard configuration file retrieved from a dashboard configuration data store 106), and a display data set 710 (e.g., retrieved from a source data store 108). The dashboard display 704 may comprise an interactive user control 712 and a graphical display element 714.

The graphical display element 714 may be associated with one or more display properties from the dashboard configuration data 708 and underlying data from the display data set 710 to be displayed. For example, a display property may determine the type of graphical display element, such as a graph or log. The underlying data to be displayed may determine what information is displayed in the graph or log, such as CPU utilization information.

The user control data 706 may define the interactive user control 712 to be displayed. The dashboard configuration data 708 may define the display properties of the graphical display element 714 to be displayed. The display data set 710 may define the underlying data to be displayed by the graphical display element 714. Furthermore, the dashboard configuration data 708 and display data set 710 may be related. For example, the dashboard configuration data 708 may define the display data set 710 that the system loads, or vice versa.

FIG. 7 further illustrates how user interaction with the interactive user control 712 may affect various elements of a dashboard system. At (1), the system may receive user input data in the interactive user control 712. At (2), the system may modify the dashboard configuration data 708 based on the received user input data. In some embodiments, as described above, the system may modify the value of a property defined in the dashboard configuration data 708. In other embodiments, the system may modify the dashboard configuration data 708 according to other methodologies. For example, the system may modify the dashboard configuration data 708 using a "pattern matching" method, such as by locating instances of a certain value within the dashboard configuration data 708 and modifying the data to instead reference a different value. For instance, the received user input data may represent a first string value "Prod," and the user control data 706 may indicate a particular second string value "Dev" in the dashboard configuration data 708 is to be replaced by the first string value. The system may then locate all instances of the string value "Dev" within a dashboard configuration data file, such as a JSON file, containing dashboard configuration data 708. The system may then replace the located instances of the string value "Dev" with the string value "Prod."

At (3), the system may update the display data set 710 based on the modified dashboard configuration data. In some embodiments, as described above, the system may update the display data set 710 by requesting and obtaining an updated data set from an external database. In other embodiments, the system may update the display data set 710 by filtering, summarizing, calculating, processing or otherwise deriving data from an initial display data set. In other embodiments, the system may update the display data set 710 by combining the initial display data set with a second data set or by removing a subset of the initial data set.

At (4), the system may update the graphical display element 714 based on the modified dashboard configuration data 708 and the updated display data set 710. Furthermore, in some embodiments, the system may update the graphical display element 714 by updating the display properties of the graphical display element.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:
1. A computer-implemented method comprising:
   under control of a computing system comprising memory and one or more computer processors configured to execute specific instructions:
      obtaining a network resource based at least partly on network resource address information, wherein the network resource address information comprises control data representing an interactive user control;

generating a network resource display using the network resource and the control data, wherein the interactive user control is included in the network resource display based at least partly on the control data;

receiving input data representing a value provided by an interaction with the interactive user control, wherein the value is associated with a property of a data set;

obtaining the data set based on at least partly on the input data; and updating the network resource display to include a data display element based at least partly on the data set.

2. The computer-implemented method of claim 1, further comprising extracting, from the control data, a set of display items and a set of corresponding values, wherein a first display item of the set of display items is associated with a first corresponding value of the set of corresponding values, and wherein generating the network resource display comprises generating the interactive user control using the set of display items.

3. The computer-implemented method of claim 2, wherein generating the interactive user control comprises generating one of a dropdown list, a set of radio buttons, or a set of checkboxes, wherein the interaction with the interactive user control comprises selection of the first display item, and wherein the value provided by the interaction with the interactive user control comprises the first corresponding value.

4. The computer-implemented method of claim 2, wherein generating the interactive user control comprises generating one of text field or a text area, and wherein the interaction with the interactive user control comprises entry of the value provided by the interaction with the interactive user control comprises the first corresponding value.

5. The computer-implemented method of claim 1, wherein obtaining the data set comprises filtering a source data set using the value represented by the input data.

6. The computer-implemented method of claim 1, further comprising:
extracting, from the control data, data source information representing a data source from which a set of display items and a set of corresponding values are to be obtained; and obtaining the set of display items and set of corresponding values from a server based at least partly on the data source information, wherein a first display item of the set of display items is associated with a first corresponding value of the set of corresponding values, and wherein generating the network resource display comprises generating the interactive user control using the set of display items.

7. The computer-implemented method of claim 1, wherein updating the network resource display comprises including, in the network resource display, the data display element, wherein the data display element comprises one of a graph or a list, and wherein the data set comprises data regarding at least one of: computing resource usage, function invocations, function execution duration, errors encountered, or log entries.

8. The computer-implemented method of claim 1, further comprising:
determining a portion of a string, represented by configuration data associated with the network resource, to be replaced by the value provided by the interaction with the interactive user control; and generating a modified string based on replacing the portion of the string with the value, wherein obtaining the data set using the value comprises causing execution of a query using the modified string.

9. The computer-implemented method of claim 8, further comprising:
obtaining the network resource based at least partly on second network resource address information different from the network resource address information, wherein the second network resource address information comprises second control data representing a second interactive user control;

obtaining the configuration data associated with the network resource; and generating a second display using the network resource and the second control data, wherein the second interactive user control is dynamically included in the second display based at least partly on the second control data.

10. The computer-implemented method of claim 8, wherein the network resource address information further comprises the configuration data.

11. The computer-implemented method of claim 8, wherein the configuration data is stored in a configuration file, and wherein the configuration file is stored in or referenced by the network resource.

12. The computer-implemented method of claim 8 further comprising:
modifying the configuration data based at least partly on the input data to generate modified configuration data, wherein the modified configuration data represents the value associated with the property; and sending the modified configuration data to a server.

13. The computer-implemented method of claim 12 wherein modifying the configuration data comprises using a pattern matching method.

14. A system comprising:
non-transitory computer-readable memory storing an executable instructions; and one or more processors programmed by the executable instructions to:
obtain a network resource based at least partly on network resource address information, wherein the network resource address information comprises control data representing an interactive user control;

generate a network resource display using the network resource and the control data, wherein the interactive user control is included in the network resource display based at least partly on the control data;

receive input data representing a value provided by an interaction with the interactive user control, wherein the value is associated with a property of a data set;

obtain the data set based on at least partly on the input data; and update the network resource display to include a data display element based at least partly on the data set.

15. The system of claim 14, wherein the one or more processors are further programmed to:
determine a portion of a string, represented by configuration data associated with the network resource, to be replaced by the value provided by the interaction with the interactive user control; and generate a modified string based on replacing the portion of the string with the value, wherein obtaining the data set using the value comprises causing execution of a query using the modified string.

16. The system of claim 15, wherein the one or more processors are further programmed to:
- obtain the network resource based at least partly on second network resource address information different from the network resource address information, wherein the second network resource address information comprises second control data representing a second interactive user control;
- obtain the configuration data associated with the network resource; and
- generate a second display using the network resource and the second control data, wherein the second interactive user control is dynamically included in the second display based at least partly on the second control data.

17. The system of claim 15, wherein the network resource address information further comprises the configuration data.

18. The system of claim 15, wherein the configuration data is stored in a configuration file, and wherein the configuration file is stored in or referenced by the network resource.

19. The system of claim 15, wherein the one or more processors are further programmed to:
- modify the configuration data based at least partly on the input data to generate modified configuration data, wherein the modified configuration data represents the value associated with the property; and
- send the modified configuration data to a server.

20. The system of claim 19, wherein the one or more processors are programmed to modify the configuration data by using a pattern matching method.

* * * * *